United States Patent [19]

Oriani et al.

[11] Patent Number: 6,111,020
[45] Date of Patent: *Aug. 29, 2000

[54] CROSSLINKED FOAMS FROM BLENDS OF ETHYLENE VINYL ACETATE AND ETHYLENE-STYRENE INTERPOLYMERS

[75] Inventors: Steven R. Oriani, Houston; Seema V. Karande, Lake Jackson, both of Tex.

[73] Assignee: The Dow Chemical Company, Midland, Mich.

[*] Notice: This patent is subject to a terminal disclaimer.

[21] Appl. No.: 09/116,192

[22] Filed: Jul. 15, 1998

Related U.S. Application Data

[63] Continuation-in-part of application No. 08/921,641, Aug. 27, 1997, Pat. No. 5,869,591, which is a continuation-in-part of application No. 08/761,050, Dec. 5, 1996, abandoned, which is a continuation of application No. 08/300,300, Sep. 2, 1994, abandoned, and a continuation-in-part of application No. 08/921,642, Aug. 27, 1997, Pat. No. 5,977,271, which is a continuation-in-part of application No. 08/761,049, Dec. 5, 1996, abandoned, which is a continuation of application No. 08/300,300, Sep. 2, 1994, abandoned.

[51] Int. Cl.$^7$ .................................................. C08C 33/06
[52] U.S. Cl. .......................... 525/222; 525/193; 525/194; 525/195; 521/89; 521/93; 521/94; 521/95; 521/97; 521/144; 521/146
[58] Field of Search ................................. 525/222, 193, 525/194, 195; 521/146, 144, 89, 93, 94, 95, 97

[56] References Cited

U.S. PATENT DOCUMENTS

| | | | |
|---|---|---|---|
| 3,284,421 | 11/1966 | Breslow | 260/80.5 |
| 3,297,674 | 1/1967 | Breslow et al. | 260/93.7 |
| 3,616,365 | 10/1971 | Stastny et al. | 204/159.14 |
| 3,644,230 | 2/1972 | Cronin | 260/2.5 E |
| 3,645,992 | 2/1972 | Elston | 260/80.78 |
| 3,886,100 | 5/1975 | Yasuda et al. | 260/2.5 B |
| 3,959,189 | 5/1976 | Kitamori | 260/2.5 B |
| 3,976,607 | 8/1976 | Hokama et al. | 525/222 |
| 4,076,698 | 2/1978 | Anderson et al. | 526/348.6 |
| 4,168,353 | 9/1979 | Kitamori | 521/59 |
| 4,214,054 | 7/1980 | Watanabe et al. | 521/95 |
| 4,429,059 | 1/1984 | Ozutsumi et al. | 521/60 |
| 5,026,798 | 6/1991 | Canich | 526/127 |
| 5,055,438 | 10/1991 | Canich | 502/117 |
| 5,057,475 | 10/1991 | Canich et al. | 502/104 |
| 5,064,802 | 11/1991 | Steven et al. | 502/155 |
| 5,096,867 | 3/1992 | Canich | 502/103 |
| 5,132,380 | 7/1992 | Stevens et al. | 526/126 |
| 5,189,192 | 2/1993 | LaPointe et al. | 556/11 |
| 5,244,996 | 9/1993 | Kawasaki et al. | 526/347 |
| 5,272,236 | 12/1993 | Lai et al. | 526/348.5 |
| 5,278,272 | 1/1994 | Lai et al. | 526/348.5 |
| 5,321,106 | 6/1994 | LaPointe | 526/126 |
| 5,347,024 | 9/1994 | Nickias et al. | 556/11 |
| 5,350,723 | 9/1994 | Neithamer et al. | 502/104 |
| 5,374,696 | 12/1994 | Rosen et al. | 526/126 |
| 5,399,635 | 3/1995 | Neithamer et al. | 526/126 |
| 5,460,993 | 10/1995 | Hsu et al. | 437/44 |
| 5,556,928 | 9/1996 | Devore et al. | 526/127 |
| 5,869,591 | 2/1999 | McKay et al. | 526/347 |

FOREIGN PATENT DOCUMENTS

| | | | |
|---|---|---|---|
| 0 416 815 A2 | 3/1991 | European Pat. Off. | C08F 10/00 |
| 0 514 828 A1 | 11/1992 | European Pat. Off. | C07F 7/28 |
| 0 520 732 A1 | 12/1992 | European Pat. Off. | C08F 10/00 |
| 2 145 961 | 4/1985 | United Kingdom . | |
| 94/00500 | 1/1994 | WIPO | C08F 10/00 |
| 95/32095 | 11/1995 | WIPO . | |
| 98/09999 | 3/1998 | WIPO | C08F 210/00 |

OTHER PUBLICATIONS

Hackh's Chem. Dictionary, 4th ed., McGraw–Hill Inc., N.Y., pp. 254 and 642, 1969.

Randall, J.C., Polymer Sequence Determination, Carbon–13 NMR Method, Academic Press New York (1977), pp. 77–78.

*Plastic Technology*, p. 25 (Sep. 1992).

Longo, Pasquale, et al., *Makromol. Chem.*, 191, pp. 2387–2396, (1990).

D'Aniello, Concetta, et al., *Journal of Applied Polymer Science*, vol. 58, pp. 1701–1706 (1995).

Xu, Guangzue, et al., *Am. Chem Soc., Div. Polymer Chem.*, vol. 35, pp. 686–687 (1994).

Lu, Zijian, et al., *Journal of Applied Polymer Science*, vol. 53, pp. 1453–1460 (1994).

Sernetz, Friedrich G., et al., *Macromol. Chem. Phys.*, vol. 197, pp. 1071–1083 (1996).

Shutov, F.A., *Handbook of Polymer Foams and Technology*, pp. 382–402 (1991).

Park, C.P., *Handbook of Polymer Foams and Technology*, pp. 198–204 (1991).

Park, C.P., *Handbook of Polymer Foams and Technology*, pp. 227–233 (1991).

Park, C.P., *Handbook of Polymer Foams and Technology*, pp. 224–228 (1991).

Park, C.P., *Handbook of Polymer Foams and Technology*, pp. 205–208 (1991).

*Primary Examiner*—Fred Teskin

[57] ABSTRACT

Ethylene vinyl acetate (EVA)/ethylene-styrene interpolymer (ESI) blends are described that are useful in preparing foams which exhibit improved compression set resistance, dimensional stability and rebound resilience at similar foam densities than known foam systems, e.g. EVA. The cross-linked foams of this invention are particularly useful in fabricating footwear and gasket products.

30 Claims, 1 Drawing Sheet

CROSSLINKED FOAMS FROM BLENDS OF ETHYLENE VINYL ACETATE AND ETHYLENE-STYRENE INTERPOLYMERS

CROSS-REFERENCE TO RELATED APPLICATIONS

This application is a continuation-in-part of application(s) application Ser. No. 08/921,641 filed Aug. 27, 1997, now U.S. Pat. Not 5,869,591, which is a continuation-in-part of U.S. Ser. No. 08/761,050 filed Dec. 5, 1996 (now abandoned), which is a continuation of U.S. Ser. No. 08/300,300 filed Sep. 2, 1994 (now abandoned); and this application is also a continuation-in-part of U.S. Ser. No. 08/921,642 filed Aug. 27, 1997, now U.S. Pat. No. 5,977,271, which is a continuation-in-part of U.S. Ser. No. 08/761,049 filed Dec. 5, 1996 (now abandoned), which is a continuation of U.S. Ser. No. 08/300,300 filed Sep. 2, 1994 (now abandoned).

STATEMENT REGARDING FEDERALLY SPONSORED RESEARCH OR DEVELOPMENT

"Not Applicable"

BACKGROUND OF THE INVENTION

The present invention pertains to blends of ethylene vinyl acetate (EVA) and ethylene-styrene interpolymers (ESI). In one embodiment, the present invention pertains to foams prepared from such blends. In another embodiment, the present invention pertains to such foams that are cross-linked and to products prepared from such cross-linked foams. In yet another embodiment, the present invention relates to a process for making such foams and products.

One embodiment of cross-linked foam products include footwear applications. Such foams must meet a variety of performance requirements, but usually the enhancement of any given performance attribute detracts from the performance of another attribute. For example, conventional foams prepared from substantially linear ethylene polymers, or ethylene vinyl acetate (EVA) polymers, or a blend of the two, often require a tradeoff between foam density, compression set resistance and rebound resilience. Low foam density is desirable from both cost and performance perspectives, but compression set resistance decreases with decreasing foam density, and foam shrinkage increases as a result of the high foam expansion needed to achieve a low foam density.

Low compression set, on the other hand, is desirable to maintain cushioning over the life of a footwear article (e.g., shoe, sandal, etc.), but low compression set usually requires higher foam density, increased polymer crystallinity, and increased cross-link density. However, increasing polymer cyrstallinity decreases rebound resilience and produces a "harder" foam. In addition, polymer density has a practical upper limit because most footwear foams must remain sufficiently thermoplastic for thermoforming into a finished shape. Moreover, high cross-link levels increase foam shrinkage.

High rebound resilience is desirable in footwear foams to maximize energy return to the wearer. Rebound resilience is maximized by low crystallinity and highly cross-linked polymers, but both of these attributes contribute to high foam shrinkage.

SUMMARY OF INVENTION

This invention includes (i) EVA/ESI interpolymer blends, (ii) EVA/ESI foamable blends, (iii) EVA/ESI cross-linked (fully or partially) foams and (iv) EVA/ESI cross-linked foams fabricated into a finished product, e.g., footwear, gaskets, etc. The cross-linked foams of this invention exhibit improved compression set resistance, dimensional stability (also known as resistance against foam shrinkage) and rebound resilience at similar foam densities than known foam systems, e.g. EVA.

The EVA/ESI blend of this invention typically comprises between about 15 to 85, preferably between about 25 to 75, and most preferably 35 to 50 weight percent (based on the total weight of the blend components), of ESI. Similarly, EVA/ESI blend of this invention typically comprises between about 85 to 15, preferably between about 75 to 25, and most preferably 65 to 50 weight percent (based on the total weight of the blend components), of EVA. Moreover, the EVA/ESI blend may contain up to about 20 weight percent, again based on the total weight of the blend components, of other thermoplastic polymers, e.g. ethylene-propylene-diene monomer (EPDM) rubber, polybutadiene rubber, homogeneous linear and substantially linear ethylene polymers, styrene-butadiene rubber, etc. These other polymers may be added to modify the properties of foams from EVA/ESI blends, e.g. to improve abrasion resistance.

In another embodiment of this invention, the EVA/ESI blend described above further comprises at least one foaming agent and at least one cross linking agent to form a foamable blend or composition. In yet another embodiment of this invention, this foamable blend is subjected to foaming conditions under which the blend is converted to a fully or partially cross linked foam. In one instance, the foamable blend is converted to a finished product, e.g. a athletic shoe midsole, outsole or sock liner, directly, e.g. through injection molding, while in another instance, the foamable blend is first converted into a foam slab which is then processed into a finished product.

Another aspect of the present invention pertains to a method for cross-linking the EVA/ESI blend, the method comprising the steps of:

(a) contacting the polymer composition with a sufficient amount of at least one peroxide compound to at least partially cross-link the polymer composition or (b) subjecting the polymer composition to a sufficient amount of electron beam radiation to at least partially cross-link the polymer composition; or (c) contacting the polymer composition with a sufficient amount of at least one silane compound to at least partially cross-link the polymer composition; or (d) contacting the polymer composition with a sufficient amount of at least one azide compound to at least partially cross-link the polymer composition; or (e) a combination of any two or more of the above cross-linking methods.

Another aspect of the present invention pertains to foams resulting from subjecting the aforementioned foamable polymer compositions to foaming conditions, e.g. the application of heat and pressure.

The subject invention further comprises fabricated parts comprising the partially or totally cross-linked foams of the invention.

DETAILED DESCRIPTION OF THE INVENTION

Figure 1:
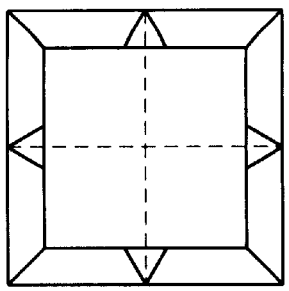
FIG. 1 is a schematic illustration of the length and width dimensions of a foam slab which are measured as part of the expansion ratio calculation.

The term "EVA" as used herein refers to one or more ethylene vinyl acetate copolymers containing from about 2 to about 40, preferably from about 10 to 35 and more preferably from about 15 to about 30 weight percent, based upon the weight of the copolymer, of vinyl acetate, with the remainder ethylene. Typically, the EVA used in the practice of this invention has a melt index (as determined by ASTM D-1238, Condition I) of between about 0.1 to about 10, preferably between about 0.5 to about 8 and more preferably from about 1 to about 5 grams/10 minutes (g/10 min). By "one or more" is meant that the EVA can comprise either a single ethylene vinyl acetate polymer or two or more ethylene vinyl acetate polymers that differ from one another in any conventional manner, e.g., molecular weight, melt index, etc.

The term "ethylene-styrene interpolymer" or "ESI" as used herein means one or more substantially random interpolymers comprising (A) from at about 1 to about 65, preferably from about 5 to about 15, mole percent of polymer units derived from (i) at least one vinyl aromatic monomer, or (ii) at least one aliphatic or cycloaliphatic vinyl or vinylidene monomer, or (iii) a combination of at least one aromatic vinyl monomer and at least one aliphatic or cycloaliphatic vinyl or vinylidene monomer, and (B) from about 35 to about 99, preferably from about 95 to about 85, mole percent polymer units derived from at least one $C_2$–$C_{20}$ α-olefin, and optionally (C) polymer units derived from one or more ethylenically unsaturated polymerizable monomers other than those of (A) and (B). Preferably, the polymer units of (A) are derived from styrene and the polymer units of (B) are derived from ethylene. If present, then the polymer units of (C) are preferably derived from a diene and are present in relatively minor amount, e.g., less than 1 mole percent. By "one or more" is meant that the ESI can comprise either a single ethylene-styrene interpolymer or two or more ethylene-styrene interpolymers that differ from one another in any conventional manner, e.g., molecular weight, comonomer composition (e.g., nature, amount or distribution of the comonomers), etc.

The term "polymer" as used herein refers to a polymeric compound prepared by polymerizing monomers whether of the same or a different type. The generic term polymer thus embraces the term homopolymer, usually employed to refer to polymers prepared from only one type of monomer, and the term interpolymer as defined hereinafter.

Any numerical values recited herein include all values from the lower value to the upper value in increments of one unit provided that there is a separation of at least 2 units between any lower value and any higher value. As an example, if it is stated that the amount of a component or a value of a process variable such as, for example, temperature, pressure, time and the like is, for example, from 1 to 90, preferably from 20 to 80, more preferably from 30 to 70, it is intended that values such as 15 to 85, 22 to 68, 43 to 51, 30 to 32 etc. are expressly enumerated in this specification. For values which are less than one, one unit is considered to be 0.0001, 0.001, 0.01 or 0.1 as appropriate. These are only examples of what is specifically intended and all possible combinations of numerical values between the lowest value and the highest value enumerated are to be considered to be expressly stated in this application in a similar manner.

The term "interpolymer" as used herein refers to polymers prepared by the polymerization of at least two different types of monomers. The generic term interpolymer thus includes copolymers, usually employed to refer to polymers prepared from two different monomers, and polymers prepared from more than two different types of monomers.

Statements herein that a polymer or interpolymer comprises or contains certain monomers, mean that such polymer or interpolymer comprises or contains polymerized therein units derived from such a monomer. For example, if a polymer is said to contain ethylene monomer, the polymer will have incorporated in it an ethylene derivative, that is, —$CH_2$—$CH_2$—.

The term "hydrocarbyl" means any aliphatic, cycloaliphatic, aromatic, aryl substituted aliphatic, aryl substituted cycloaliphatic, aliphatic substituted aromatic, or cycloaliphatic substituted aromatic groups. The aliphatic or cycloaliphatic groups are preferably saturated. Likewise, the term "hydrocarbyloxy" means a hydrocarbyl group having an oxygen linkage between it and the carbon atom to which it is attached.

The term "monomer residue" or "polymer units derived from such monomer" means that portion of the polymerizable monomer molecule which resides in the polymer chain as a result of being polymerized with another polymerizable molecule to make the polymer chain.

The term "substantially random" in the substantially random interpolymer resulting from polymerizing one or more α-olefin monomers and one or more vinyl aromatic monomers or hindered aliphatic or cycloaliphatic vinyl or vinylidene monomers, and optionally, with other polymerizable ethylenically unsaturated monomer(s) as used herein means that the distribution of the monomers of said interpolymer can be described by the Bernoulli statistical model or by a first or second order Markovian statistical model, as described by J. C. Randall in *POLYMER SEQUENCE DETERMINATION Carbon*-13 *NMR Method*, Academic Press New York, 1977, pp. 71–78. Preferably, the substantially random interpolymer resulting from polymerizing one or more α-olefin monomers and one or more vinyl aromatic monomer, and optionally, with other polymerizable ethylenically unsaturated monomer(s) does not contain more than 15 percent of the total amount of vinyl aromatic monomer residue in blocks of vinyl aromatic monomer of more than 3 units. More preferably, the interpolymer is not characterized by a high degree of either isotacticity or syndiotacticity. This means that in the carbon$^{-13}$ NMR spectrum of the substantially random interpolymer the peak areas corresponding to the main chain methylene and methine carbons representing either meso diad sequences or racemic diad sequences should not exceed 75 percent of the total peak area of the main chain methylene and methine carbons.

Pseudorandom interpolymers are a subset of substantially random interpolymers. Pseudorandom interpolymers are characterized by an architecture in which all phenyl (or substituted phenyl) groups which are pendant from the polymer backbone are separated by two or more carbon backbone units. In other words, the pseudorandom interpolymers of the invention, in their noncross-linked state, can be described by the following general formula (using styrene as the vinyl aromatic monomer and ethylene as the α-olefin for illustration):

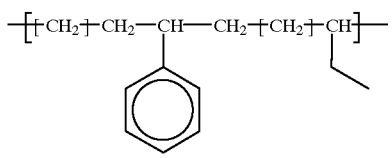

Noncross-linked pseudorandom interpolymers are described in European Patent Publication 416,815-A, the relevant parts of which are incorporated herein by reference.

While not wishing to be bound by any particular theory, it is believed that during the addition polymerization reaction of, for example, ethylene and styrene, in the presence of a constrained geometry catalyst as described below, if a styrene monomer is inserted into the growing polymer chain, the next monomer inserted will be an ethylene monomer or a styrene monomer inserted in an inverted or "tail-to-tail" fashion. It is believed that after an inverted or "tail-to-tail" styrene monomer is inserted, the next monomer will be ethylene, as the insertion of a second styrene monomer at this point would place it too close to the inverted styrene monomer, that is, less than two carbon backbone units away.

Preferably, the substantially random interpolymer will be characterized as largely atactic, as indicated by a 13C-NMR spectrum in which the peak areas corresponding to the main chain methylene and methine carbons representing either meso diad sequences or racemic diad sequences does not exceed 75 percent of the total peak area of the main chain methylene and methine carbons.

Substantially random ESI include substantially random interpolymers prepared by polymerizing one or more α-olefin monomers with one or more vinyl aromatic monomers and/or one or more hindered aliphatic or cycloaliphatic vinyl or vinylidene monomers, and optionally with other polymerizable ethylenically unsaturated monomer(s).

Suitable α-olefin monomers include for example, α-olefin monomers containing from 2 to 20, preferably from 2 to 12, more preferably from 2 to 8 carbon atoms. Preferred such monomers include ethylene, propylene, butene-1, 4-methyl-1-pentene, hexene-1 and octene-1. Most preferred are ethylene or a combination of ethylene with $C_{3-8}$ α-olefins. These α-olefins do not contain an aromatic moiety.

Suitable vinyl aromatic monomers which can be employed to prepare the interpolymers employed herein include, for example, those represented by the following formula:

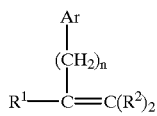

wherein $R^1$ is selected from the group of radicals consisting of hydrogen and alkyl radicals containing from 1 to 4 carbon atoms, preferably hydrogen or methyl; each $R^2$ is independently selected from the group of radicals consisting of hydrogen and alkyl radicals containing from 1 to 4 carbon atoms, preferably hydrogen or methyl; Ar is a phenyl group or a phenyl group substituted with from 1 to 5 substituents selected from the group consisting of halo, $C_{1-4}$-alkyl, and $C_{1-4}$-haloalkyl; and n has a value from zero to 4, preferably from zero to 2, most preferably zero. Exemplary vinyl aromatic monomers include styrene, vinyl toluene, α-methylstyrene, t-butyl styrene, chlorostyrene, including all isomers of these compounds, and the like. Particularly suitable such monomers include styrene and lower alkyl- or halogen-substituted derivatives thereof. Preferred monomers include styrene, a-methyl styrene, the lower alkyl- ($C_1$–$C_4$) or phenyl-ring substituted derivatives of styrene, such as for example, ortho-, meta-, and para-methylstyrene, the ring halogenated styrenes, para-vinyl toluene or mixtures thereof, and the like. A more preferred aromatic vinyl monomer is styrene.

By the term "hindered aliphatic or cycloaliphatic vinyl or vinylidene compounds", it is meant addition polymerizable vinyl or vinylidene monomers corresponding to the formula:

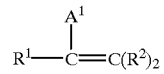

wherein $A^1$ is a sterically bulky, aliphatic or cycloaliphatic substituent of up to 20 carbons, $R^1$ is selected from the group of radicals consisting of hydrogen and alkyl radicals containing from 1 to 4 carbon atoms, preferably hydrogen or methyl; each $R^2$ is independently selected from the group of radicals consisting of hydrogen and alkyl radicals containing from 1 to 4 carbon atoms, preferably hydrogen or methyl; or alternatively $R^1$ and $A^1$ together form a ring system. By the term "sterically bulky" is meant that the monomer bearing this substituent is normally incapable of addition polymerization by standard Ziegler-Natta polymerization catalysts at a rate comparable with ethylene polymerizations. α-Olefin monomers containing from 2 to 20 carbon atoms and having a linear aliphatic structure such as propylene, butene-1, hexene-1 and octene-1 are not considered as hindered aliphatic monomers. Preferred hindered aliphatic or cycloaliphatic vinyl or vinylidene compounds are monomers in which one of the carbon atoms bearing ethylenic unsaturation is tertiary or quaternary substituted. Examples of such substituents include cyclic aliphatic groups such as cyclohexyl, cyclohexenyl, cyclooctenyl, or ring alkyl or aryl substituted derivatives thereof, tert-butyl, norbornyl, and the like. Most preferred hindered aliphatic or cycloaliphatic vinyl or vinylidene compounds are the various isomeric vinyl- ring substituted derivatives of cyclohexene and substituted cyclohexenes, and 5-ethylidene-2-norbornene. Especially suitable are 1-, 3-, and 4-vinylcyclohexene.

The number average molecular weight (Mn) of the ESI used to the make the blends, foams and finished products of this invention is usually greater than 5,000, preferably from 20,000 to 1,000,000, more preferably from 50,000 to 500,000.

Polymerizations and unreacted monomer removal at temperatures above the autopolymerization temperature of the respective monomers may result in formation of some amounts of homopolymer polymerization products resulting from free radical polymerization. For example, while preparing the substantially random interpolymer, an amount of atactic vinyl aromatic homopolymer may be formed due to homopolymerization of the vinyl aromatic monomer at elevated temperatures. The presence of vinyl aromatic homopolymer is in general not detrimental for the purposes of the present invention and can be tolerated. The vinyl aromatic homopolymer may be separated from the interpolymer, if desired, by extraction techniques such as selective precipitation from solution with a non solvent for either the interpolymer or the vinyl aromatic homopolymer. For the purpose of the present invention it is preferred that no more than 20 weight percent, preferably less than 15 weight percent based on the total weight of the interpolymers of vinyl aromatic homopolymer is present.

The substantially random interpolymers may be modified by typical grafting, hydrogenation, functionalizing, or other reactions well known to those skilled in the art. The polymers may be readily sulfonated or chlorinated to provide functionalized derivatives according to established techniques.

The substantially random interpolymers can be prepared as described in U.S. application Ser. No. 07/545,403 filed Jul. 3, 1990 (corresponding to EP-A-0,416,815) by James C. Stevens et al. and in U.S. Pat. No. 5,703,187, all of which are incorporated herein by reference in their entirety. Preferred operating conditions for such polymerization reactions are pressures from atmospheric up to 3,000 atmospheres and temperatures from −30° C. to 200° C.

Examples of suitable catalysts and methods for preparing the substantially random interpolymers are disclosed in U.S. application Ser. No. 07/545,403, filed Jul. 3, 1990 corresponding to EP-A-416,815; U.S. application Ser. No. 07/702,475, filed May 20, 1991 (now abandoned) corresponding to EP-A-514,828; U.S. Pat. No. 5,721,185 corresponding to EP-A-520,732, U.S. Pat. No. 4,885,315, as well as U.S. Pat. Nos. 5,055,438; 5,057,475; 5,096,867; 5,064,802; 5,132,380; 5,189,192; 5,321,106; 5,347,024; 5,350,723; 5,374,696; 5,399,635; 5,460,993 and 5,556,928. All of the U.S. patents are incorporated herein by reference in their entirety.

The substantially random α-olefin/vinyl aromatic interpolymers can also be prepared by the methods described by John G. Bradfute et al. (W. R. Grace & Co.) in WO 95/32095; by R. B. Pannell (Exxon Chemical Patents, Inc.) in WO 94/00500; and in *Plastics Technology*, p. 25 (September 1992), all of which are incorporated herein by reference in their entirety.

Also suitable are the substantially random interpolymers which comprise at least one α-olefin/vinyl aromatic/vinyl aromatic/α-olefin tetrad disclosed in U.S. application Ser. No. 08/708,809 filed Sep. 4, 1996 and WO 98/09999 both by Francis J. Timmers et al. These interpolymers contain additional signals in their carbon-13 NMR spectra with intensities greater than three times the peak to peak noise. These signals appear in the chemical shift range 43.70–44.25 ppm and 38.0–38.5 ppm. Specifically, major peaks are observed at 44.1, 43.9, and 38.2 ppm. A proton test NMR experiment indicates that the signals in the chemical shift region 43.70–44.25 ppm are methine carbons and the signals in the region 38.0–38.5 ppm are methylene carbons.

In order to determine the carbon$^{-13}$ NMR chemical shifts of the interpolymers described, the following procedures and conditions are employed. A five to ten weight percent polymer solution is prepared in a mixture consisting of 50 volume percent 1,1,2,2-tetrachloroethane-$d_2$ and 50 volume percent 0.10 molar chromium tris(acetylacetonate) in 1,2,4-trichlorobenzene. NMR spectra are acquired at 130° C. using an inverse gated decoupling sequence, a 90° pulse width and a pulse delay of five seconds or more. The spectra are referenced to the isolated methylene signal of the polymer assigned at 30.000 ppm.

It is believed that these new signals are due to sequences involving two head-to-tail vinyl aromatic monomer preceded and followed by at least one α-olefin insertion, e.g. an ethylene/styrene/styrene/ethylene tetrad wherein the styrene monomer insertions of said tetrads occur exclusively in a 1,2 (head to tail) manner. It is understood by one skilled in the art that for such tetrads involving a vinyl aromatic monomer other than styrene and an α-olefin other than ethylene that the ethylene/vinyl aromatic monomer/vinyl aromatic monomer/ethylene tetrad will give rise to similar carbon$^{-13}$ NMR peaks but with slightly different chemical shifts.

These interpolymers are prepared by conducting the polymerization at temperatures of from −30° C. to 250° C. in the presence of such catalysts as those represented by the formula

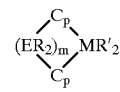

wherein: each Cp is independently, each occurrence, a substituted cyclopentadienyl group π-bound to M; E is C or Si; M is a group IV metal, preferably Zr or Hf, most preferably Zr; each R is independently, each occurrence, H, hydrocarbyl, silahydrocarbyl, or hydrocarbylsilyl, containing up to 30 preferably from 1 to 20 more preferably from 1 to 10 carbon or silicon atoms; each $R^1$ is independently, each occurrence, H, halo, hydrocarbyl, hyrocarbyloxy, silahydrocarbyl, hydrocarbylsilyl containing up to 30 preferably from 1 to 20 more preferably from 1 to 10 carbon or silicon atoms or two R' groups together can be a $C_{1-10}$ hydrocarbyl substituted 1,3-butadiene; m is 1 or 2; and optionally, but preferably in the presence of an activating cocatalyst. Particularly, suitable substituted cyclopentadienyl groups include those illustrated by the formula:

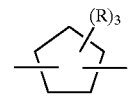

wherein each R is independently, each occurrence, H, hydrocarbyl, silahydrocarbyl, or hydrocarbylsilyl, containing up to 30 preferably from 1 to 20 more preferably from 1 to 10 carbon or silicon atoms or two R groups together form a divalent derivative of such group. Preferably, R independently each occurrence is (including where appropriate all isomers) hydrogen, methyl, ethyl, propyl, butyl, pentyl, hexyl, benzyl, phenyl or silyl or (where appropriate) two such R groups are linked together forming a fused ring system such as indenyl, fluorenyl, tetrahydroindenyl, tetrahydrofluorenyl, or octahydrofluorenyl.

Particularly preferred catalysts include, for example, racemic-(dimethylsilanediyl)-bis-(2-methyl-4-phenylindenyl))zirconium dichloride, racemic-(dimethylsilanediyl)-bis-(2-methyl-4-phenylindenyl)) zirconium 1,4-diphenyl-1,3-butadiene, racemic-(dimethylsilanediyl)-bis-(2-methyl-4-phenylindenyl)) zirconium di-$C_{1-4}$ alkyl, racemic-(dimethylsilanediyl)-bis-(2-methyl-4-phenylindenyl))zirconium di-$C_{1-4}$ alkoxide, or any combination thereof and the like.

It is also possible to use the following titanium-based constrained geometry catalysts, [N-(1,1-dimethylethyl)-1,1-dimethyl-1-[1,2,3,4,5-η)-1,5,6,7-tetrahydro-s-indacen-1-yl] silanaminato(2-)-N]titanium diethyl; (1-indenyl)(tert-butylamiido) dimethyl-silane titanium dimethyl; ((3-tert-butyl)(1,2,3,4,5-η)-1-indenyl)(tert-butylamido) dimethylsilane titanium dimethyl; and ((3-iso-propyl)(1,2,3, 4,5-η)-1-indenyl)(tert-butylamido)dimethylsilane titanium dimethyl, or any combination thereof and the like.

Further preparative methods for the interpolymer component (A) of the present invention have been described in the literature. Longo and Grassi (*Makromol. Chem.*, Volume 191, pages 2387 to 2396 [1990]) and D'Anniello et al.

(Journal of Applied Polymer Science, Volume 58, pages 1701–1706 [1995]) reported the use of a catalytic system based on methylalumoxane (MAO) and cyclopentadienyltitanium trichloride (CpTiCl$_3$) to prepare an ethylene-styrene copolymer. Xu and Lin (*Polymer Preprints, Am.Chem.Soc., Div.Polym.Chem.*) Volume 35, pages 686,687 [1994]) have reported copolymerization using a MgCl$_2$/TiCl$_4$/NdCl$_3$/Al (iBu)$_3$ catalyst to give random copolymers of styrene and propylene. Lu et al (*Journal of Applied Polymer Science*, Volume 53, pages 1453 to 1460 [1994]) have described the copolymerization of ethylene and styrene using a TiCl$_4$/NdCl$_3$/ MgCl$_2$/Al(Et)$_3$ catalyst. Sernetz and Mulhaupt, (*Macromol. Chem. Phys.*, v. 197, pp 1071–1083, 1997) have described the influence of polymerization conditions on the copolymerization of styrene with ethylene using Me$_2$Si (Me$_4$Cp)(N-tert-butyl)TiCl$_2$/methylaluminoxane Ziegler-Natta catalysts. The manufacture of α-olefin/vinyl aromatic monomer interpolymers such as propylene/styrene and butene/styrene are described in U.S. Pat. No 5,244,996, issued to Mitsui Petrochemical Industries Ltd. All the above methods disclosed for preparing the interpolymer component are incorporated herein by reference.

The conditions for polymerizing the α-olefin, vinyl aromatic monomers, are generally those useful in the solution polymerization process, although the application of the present invention is not limited thereto. High pressure, slurry and gas phase polymerization processes are also believed to be useful, provided the proper catalysts and polymerization conditions are employed.

In general, the polymerization useful in the practice of the subject invention may be accomplished at conditions well known in the prior art for Ziegler-Natta or Kaminsky-Sinn type polymerizations. In particular, the polymerization will typically involve pressures from atmospheric up to 1000 atmospheres (100 MPa) and temperatures from 0° C. to 250° C.

While polymerizing and isolating the substantially random interpolymer, a small amount of atactic vinyl aromatic homopolymer may be formed due to homopolymerization of the vinyl aromatic monomer. In general, the higher the polymerization temperature is, the higher is the amount of homopolymer formed. The presence of vinyl aromatic homopolymer is in general not detrimental for the purposes of the present invention and can be tolerated. For the purpose of the present invention it is preferred that no more than 20 weight percent, preferably less than 15 weight percent based on the total weight of the interpolymers of vinyl aromatic homopolymer is present. If desired, the vinyl aromatic homopolymer may be at least partially separated from the substantially random interpolymer, if desired, such as by extraction with a suitable extracting solvent.

The substantially random interpolymers may be modified by typical grafting, cross-linking, hydrogenation, functionalizing, or other reactions well known to those skilled in the art, provided that the elastomeric properties of the interpolymers are not substantially affected. The polymers may be readily sulfonated or chlorinated to provide functionalized derivatives according to established techniques.

Cross-linking the Random Interpolymers

Possible cross-linking agents include peroxides, phenols, azides, aldehyde-amine reaction products, substituted ureas, substituted guanidines; substituted xanthates; substituted dithiocarbamates; sulfur-containing compounds, such as thiazoles, imidazoles, sulfenamides, thiuramidisulfides, paraquinonedioxime, dibenzoparaquinonedioxime, sulfur; and combinations thereof. See Encyclopedia of Chemical Technology, Vol. 17, 2nd edition, Interscience Publishers, 1968; also Organic Peroxides, Daniel Seern, Vol. 1, Wiley-Interscience, 1970).

Examples of useful organic peroxides include dicumyl peroxide, t-butylisopropylidene peroxybenzene, 1,1-di-t-butyl peroxy-3,3,5-trimethylcyclohexane, 2,5-dimethyl-2,5-di(t-butyl peroxy) hexane, t-butyl-cumyl peroxide, di-t-butyl peroxide, and 2,5-dimethyl-2,5-di-(t-butyl peroxy) hexyne. Dicumyl peroxide is the preferred agent. Additional teachings regarding organic peroxide cross-linking agents are available in the *Handbook of Polymer Foams and Technology*, pp. 198–204, supra.

Suitable azides include azidoformates, such as tetramethylenebis(azidoformate) (see, also, U.S. Pat. No. 3,284,421, Breslow, Nov. 8, 1966); aromatic polyazides, such as 4,4'-diphenylmethane diazide (see, also, U.S. Pat. No. 3,297,674, Breslow et al., Jan. 10, 1967); and sulfonazides, such as p,p'-oxybis(benzene sulfonyl azide).

The poly(sulfonyl azide) is any compound having at least two sulfonyl azide groups (—SO$_2$N$_3$) reactive with the substantially random interpolymer. Preferably the poly (sulfonyl azide)s have a structure X—R—X wherein each X is SO$_2$N$_3$ and R represents an unsubstituted or inertly substituted hydrocarbyl, hydrocarbyl ether or silicon-containing group, preferably having sufficient carbon, oxygen or silicon, preferably carbon, atoms to separate the sulfonyl azide groups sufficiently to permit a facile reaction between the substantially random interpolymer and the sulfonyl azide, more preferably at least 1, more preferably at least 2, most preferably at least 3 carbon, oxygen or silicon, preferably carbon, atoms between functional groups. The term inertly substituted refers to substitution with atoms or groups which do not undesirably interfere with the desired reaction (s) or desired properties of the resulting cross-linked polymers. Such groups include flourine, aliphatic or aromatic ether, siloxanes, as well as sulfonyl azide groups when more than two substantially random interpolymer chains are to be joined. Suitable structures include R as aryl, alkyl, aryl alkaryl, arylalkyl silane, or heterocyclic, groups and other groups which are inert and separate the sulfonyl azide groups as described. More preferably R includes at least one aryl group between the sulfonyl groups, most preferably at least two aryl groups (such as when R is 4,4' diphenylether or 4,4'-biphenyl). When R is one aryl group, it is preferred that the group have more than one ring, as in the case of naphthylene bis(sulfonyl azides). Poly(sulfonyl)azides include such compounds as 1,5-pentane bis(sulfontlazide), 1,8-octane bis(sulfonyl azide), 1,10-decane bis(sulfonyl azide), 1,10-octadecane bis(sulfonyl azide), 1-octyl-2,4,6-benzene tris(sulfonyl azide), 4,4'-diphenyl ether bis(sulfonyl azide), 1,6-bis(4'-sulfonazidophenyl)hexane, 2,7-naphthalene bis(sulfonyl azide), and mixed sulfonyl azides of chlorinated aliphatic hydrocarbons containing an average of from 1 to 8 chlorine atoms and from about 2 to 5 sulfonyl azide groups per molecule, and mixtures thereof. Preferred poly(sulfonyl azide)s include oxy-bis(4-sulfonylazidobenzene), 2,7-naphthalene bis(sulfonyl azido), 4,4'-bis(sulfonyl azido)biphenyl, 4,4'-diphenyl ether bis (sulfonyl azide) and bis(4-sulfonyl azidophenyl)methane, and mixtures thereof.

To cross-link, the poly(sulfonyl azide) is used in a cross-linking amount, that is an amount effective to cross-link the substantially random interpolymer as compared with the starting material substantially random interpolymer, that is sufficient poly(sulfonyl azide) to result in the formation of at least about 10 weight percent gels as evidenced by insolubility of the gels in boiling xylene when tested according to ASTM D-2765A-84. The amount is preferably at least about 0.5, more preferably at least about 1.0, most preferably 2.0 weight percent poly(sulfonyl azide) based on total weight of substantially random interpolymer, with these values depending on the molecular weight of the azide and the molecular weight or melt index of the substantially random interpolymer. To avoid uncontrolled heating and unnecessary cost, degradation of physical properties, the amount of poly(sulfonyl azide) is preferably less than about 10 weight percent, more preferably less than about 5.

For cross-linking, the sulfonyl azide is admixed with the substantially random interpolymer and heated to at least the decomposition temperature of the sulfonyl azide, that is usually greater than 100° C. and most frequently greater than 150° C. The preferred temperature range depends on the nature of the azide that is used. For example, in the case of 4,4'-disulfonylazidediphenylether the preferred temperature range is greater than about 150° C., preferably greater than about 160° C., more preferably greater than about 185° C., most preferably greater than 190° C. Preferably, the upper temperature is less than 250° C.

Suitable aldehyde-amine reaction products include formaldehyde-ammonia; formaldehyde-ethylchloride-ammonia; acetaldehyde-ammonia; formaldehyde-aniline; butyraldehyde-aniline; and heptaldehyde-aniline.

Suitable substituted ureas include trimethylthiourea; diethylthiourea; dibutylthiourea; tripentylthiourea; 1,3-bis(2-benzothiazolylmercaptomethyl)urea; and N,N-diphenylthiourea.

Suitable substituted guanidines include diphenylguanidine; di-o-tolylguanidine; diphenylguanidine phthalate; and the di-o-tolylguanidine salt of dicatechol borate.

Suitable substituted xanthates include zinc ethylxanthate; sodium isopropylxanthate; butylxanthic disulfide; potassium isopropylxanthate; and zinc butylxanthate.

Suitable dithiocarbamates include copper dimethyl-, zinc dimethyl-, tellurium diethyl-, cadmium dicyclohexyl-, lead dimethyl-, lead dimethyl-, selenium dibutyl-, zinc pentamethylene-, zinc didecyl-, and zinc isopropyloctyl-dithiocarbamate.

Suitable thiazoles include 2-mercaptobenzothiazole, zinc mercaptothiazolyl mercaptide, 2-benzothiazolyl-N,N-diethylthiocarbamyl sulfide, and 2,2'-dithiobis(benzothiazole).

Suitable imidazoles include 2-mercaptoimidazoline and 2-mercapto-4,4,6-trimethyldihydropyrimidine.

Suitable sulfenamides include N-t-butyl-2-benzothiazole-, N-cyclohexylbenzothiazole-, N,N-diisopropylbenzothiazole-, N-(2,6-dimethylmorpholino)-2-benzothiazole-, and N,N-diethylbenzothiazole-sulfenamide.

Suitable thiuramidisulfides include N,N'-diethyl-, tetrabutyl-, N,N'-diisopropyldioctyl-, tetramethyl-, N,N'-dicyclohexyl-, and N,N'-tetralaurylthiuramidisulfide.

Those skilled in the art will be readily able to select amounts of cross-linking agent, with the amount selected taking into account characteristics of the substantially random interpolymer or blend comprising such substantially random interpolymer, such as molecular weight, molecular weight distribution, comonomer content, the presence of cross-linking enhancing coagents, additives (such as oil) etc. Since it is expressly contemplated that the substantially random interpolymer may be blended with other polymers prior to cross-linking, those skilled in the art may use the following guidelines as a reference point in optimizing the amount of cross-linking agent preferred for the particular blends in question.

For instance, in the case of cross-linking using dicumyl peroxide, typically the dicumyl peroxide will be provided to the EVA/ESI blend in an amount of at least about 0.1 weight percent, preferably at least about 0.25 weight percent, more preferably at least about 0.5 weight percent based on the combined weight of polymer and peroxide.

Typically, the amount of cross-linking agent employed will not exceed that which is required to effect the desired level of cross-linking. For instance, dicumyl peroxide will typically not be employed in an amount greater than about 6 weight percent, preferably no more than about 4 weight percent based on the combined weight of polymer and peroxide.

Alternatively, silane cross-linking agents may be employed. In this regard, any silane that will effectively graft to and cross-link the substantially random interpolymers can be used in the practice of this invention. Suitable silanes include unsaturated silanes that comprise an ethylenically unsaturated hydrocarbyl group, such as a vinyl, allyl, isopropenyl, butenyl, cyclohexenyl or γ-(meth)acryloxy allyl group, and a hydrolyzable group, such as, for example, a hydrocarbyloxy, hydrocarbonyloxy, or hydrocarbylamino group. Examples of hydrolyzable groups include methoxy, ethoxy, formyloxy, acetoxy, proprionyloxy, and alkyl or arylamino groups. Preferred silanes are the unsaturated alkoxy silanes which can be grafted onto the polymer. These silanes and their method of preparation are more fully described in U.S. Pat. No. 5,266,627 to Meverden, et al. Vinyl trimethoxy silane, vinyl triethoxy silane, γ-(meth)acryloxy propyl trimethoxy silane and mixtures of these silanes are the preferred silane cross-linkers for use in this invention.

The amount of silane cross-linking agent used in the practice of this invention can vary widely depending upon the nature of the substantially random interpolymer, the silane employed, the processing conditions, the amount of grafting initiator, the ultimate application, and similar factors. Typically, in the case of cross-linking using vinyltrimethoxysilane (VTMOS), the VTMOS will typically be provided in an amount of at least about 0.1 weight percent, preferably at least about 0.5 weight percent, more preferably at least about 1 weight percent based on the combined weight of polymer and silane.

Considerations of convenience and economy are usually the two principal limitations on the maximum amount of silane cross-linker used in the practice of this invention. For instance, when VTMOS is employed, the maximum amount of VTMOS employed will typically not exceed 10 weight percent, and more preferably does not exceed 8, and most preferably does not exceed 6 weight percent based on the combined weight of polymer and silane.

Those skilled in the art will be readily able to select amounts of initiator employed, with the amount selected taking into account characteristics of the substantially random interpolymer, such as molecular weight, molecular weight distribution, comonomer content, as well as the presence of cross-linking enhancing coagents, additives (such as oil) etc.

Cross-linking is promoted with a catalyst, and any catalyst that will provide this function can be used in this invention. These catalysts generally include organic bases, carboxylic acids, and organometallic compounds including organic titanates and complexes or carboxylates of lead, cobalt, iron, nickel, zinc and tin. Dibutyltindilaurate, dioctyltinmaleate, dibutyltindiacetate, dibutyltindioctoate, stannous acetate, stannous octoate, lead naphthenate, zinc caprylate, cobalt naphthenate; and the like. Tin carboxylate, especially dibutyltindilaurate and dioctyltinmaleate, are particularly effective for this invention.

Rather than employing a chemical cross-linking agent, cross-linking may be effected by use of radiation. Useful radiation types include electron beam or beta ray, gamma rays, X-rays, or neutron rays. Radiation is believed to effect cross-linking by generating polymer radicals which may combine and cross-link. Additional teachings concerning radiation cross-linking are seen in C. P. Park, "Polyolefin Foam" Chapter 9, Handbook of Polymer Foams and Technology, D. Klempner and K. C. Frisch, eds., Hanser Publishers, New York (1991), pages 198–204, which is incorporated herein by reference.

Radiation dosage depends upon the composition of the substantially random interpolymer. Generally speaking, as the amount of the vinylidene aromatic or hindered aliphatic or cycloaliphatic comonomer increases, greater dosages will be required to cause the desired level of cross-linking, that is, to lead to compositions exhibiting at least 10 percent gel, preferably at least 20 percent gel, and more preferably at least 30 percent gel. Those skilled in the art will be readily able to select suitable radiation levels, taking into account such variables as thickness and geometry of the article to be irradiated, as well as to characteristics of the substantially random interpolymer, such as molecular weight, molecular weight distribution, comonomer content, the presence of cross-linking enhancing coagents, additives (such as oil), etc.

Typically, the dosage will not exceed that which is required to effect the desired level of cross-linking. For instance, dosages above about 80 Mrad are not typically employed.

In the case of substantially random interpolymers not including the optional diene component, peroxide or azide cure systems are preferred; in the case of interpolymer with high styrene content (>than 50 wt. percent) azide cure systems are preferred; in the case of substantially random interpolymers including the optional diene component, sulfur-based (for example, containing sulfur, a dithiocarbamate, a thiazole, an imidazole, a sulfenamide, a thiuramidisulfide or combinations thereof) and phenolic cure systems are preferred.

In certain embodiments of the claimed invention, dual cure systems, which use a combination of heat, moisture cure, and radiation steps, may be effectively employed. Dual cure systems are disclosed and claimed in U.S. patent application Ser. No. 536,022, filed on Sep. 29, 1995, in the names of K. L. Walton and S. V. Karande, incorporated herein by reference. For instance, it may be desirable to employ peroxide cross-linking agents in conjunction with silane cross-linking agents, peroxide cross-linking agents in conjunction with radiation, sulfur-containing cross-linking agents in conjunction with silane cross-linking agents, etc.

Preparation of Polymer Blends

Olefinic polymers suitable for use as the optional component, i.e., the component present in an amount of up to about 20 weight percent of the blend, employed in the present invention are aliphatic α-olefin homopolymers or interpolymers, or interpolymers of one or more aliphatic α-olefins and one or more non-aromatic monomers interpolymerizable therewith such as $C_2$–$C_{20}$ α-olefins or those aliphatic α-olefins having from 2 to about 20 carbon atoms and containing polar groups. Suitable aliphatic α-olefin monomers which introduce polar groups into the polymer include, for example, ethylenically unsaturated nitriles such as acrylonitrile, methacrylonitrile, ethacrylonitrile, etc.; ethylenically unsaturated anhydrides such as maleic anhydride; ethylenically unsaturated amides such as acrylamide, methacrylamide etc.; ethylenically unsaturated carboxylic acids (both mono- and difunctional) such as acrylic acid and methacrylic acid, etc.; esters (especially lower, e.g. $C_1$–$C_6$, alkyl esters) of ethylenically unsaturated carboxylic acids such as methyl methacrylate, ethyl acrylate, hydroxyethylacrylate, n-butyl acrylate or methacrylate, 2-ethyl-hexylacrylate etc.; ethylenically unsaturated vinyl alcohols, such as ethylene vinyl alcohol (EVOH); ethylenically unsaturated dicarboxylic acid imides such as N-alkyl or N-aryl maleimides such as N-phenyl maleimide, etc. Preferably such monomers containing polar groups are acrylic acid, maleic anhydride and acrylonitrile. Halogen groups which can be included in the polymers from aliphatic α-olefin monomers include fluorine, chlorine and bromine; preferably such polymers are chlorinated polyethylenes (CPEs). Preferred olefinic polymers for use in the present invention are homopolymers or interpolymers of an aliphatic, including cycloaliphatic, α-olefin having from 2 to 18 carbon atoms. Suitable examples are homopolymers of ethylene or propylene, and interpolymers of two or more α-olefin monomers. Other preferred olefinic polymers are interpolymers of ethylene and one or more other α-olefins having from 3 to 8 carbon atoms. Preferred comonomers include 1-butene, 4-methyl-1-pentene, 1-hexene, and 1-octene. The optional component of the olefinic polymer blend may also contain, in addition to the α-olefin, one or more non-aromatic monomers interpolymerizable therewith. Such additional interpolymerizable monomers include, for example, $C_4$–$C_{20}$ dienes, preferably, butadiene or 5-ethylidene-2-norbornene. The olefinic polymers can be further characterized by their degree of long or short chain branching and the distribution thereof.

One class of olefinic polymers is generally produced by a high pressure polymerization process using a free radical initiator resulting in the traditional long chain branched low density polyethylene (LDPE). LDPE employed in the present composition usually has a density of less than 0.94 g/cc (ASTM D 792) and a melt index of from 0.01 to 100, and preferably from 0.1 to 50 grams per 10 minutes (as determined by ASTM Test Method D 1238, condition I).

Another class is the linear olefin polymers which have an absence of long chain branching, as the traditional linear low density polyethylene polymers (heterogeneous LLDPE) or linear high density polyethylene polymers (HDPE) made using Ziegler polymerization processes (for example, U.S. Pat. No. 4,076,698 (Anderson et al.), sometimes called heterogeneous polymers.

HDPE consists mainly of long linear polyethylene chains. The HDPE employed in the present composition usually has a density of at least 0.94 grams per cubic centimeter (g/cc) as determined by ASTM Test Method D 792, and a melt index (ASTM-1238, condition I) in the range of from 0.01 to 100, and preferably from 0.1 to 50 grams per 10 minutes.

The heterogeneous LLDPE employed in the present composition generally has a density of from 0.85 to 0.94 g/cc (ASTM D 792), and a melt index (ASTM-1238, condition I) in the range of from 0.01 to 100, and preferably from 0.1 to 50 grams per 10 minutes. Preferably the LLDPE is an interpolymer of ethylene and one or more other α-olefins having from 3 to 18 carbon atoms, more preferably from 3–8 carbon atoms. Preferred comonomers include 1-butene, 4-methyl-1-pentene, 1-hexene, and 1-octene.

A further class is that of the uniformly branched or homogeneous ethylene polymers. The homogeneous linear ethylene polymers contain no long chain branches and have only branches derived from the monomers (if having more than two carbon atoms). Homogeneous linear ethylene polymers include those made as described in U.S. Pat. No.

3,645,992 (Elston), and those made using so-called single site catalysts in a batch reactor having relatively high olefin concentrations (as described in U.S. Pat. Nos. 5,026,798 and 5,055,438 (Canich). The uniformly branched/homogeneous linear ethylene polymers are those polymers in which the comonomer is randomly distributed within a given interpolymer molecule and wherein the interpolymer molecules have a similar ethylene/comonomer ratio within that interpolymer.

The homogeneous linear ethylene polymer employed in the present composition generally has a density of from 0.85 to 0.94 g/cc (ASTM D 792), and a melt index (ASTM1238, condition I) in the range of from 0.01 to 100, and preferably from 0.1 to 50 grams per 10 minutes. Preferably the homogeneous linear ethylene polymer is an interpolymer of ethylene and one or more other $\alpha$-olefins having from 3 to 18 carbon atoms, more preferably from 3–8 carbon atoms. Preferred comonomers include 1-butene, 4-methyl-1-pentene, 1-hexene, and 1-octene.

Further, there is the class of substantially linear olefin polymers (SLOP) that may advantageously be used in the optional component of the blends of the present invention. These polymers have a processability similar to LDPE, but the strength and toughness of LLDPE. Similar to the traditional homogeneous polymers, the substantially linear ethylene/$\alpha$-olefin interpolymers have only a single melting peak, as opposed to traditional Ziegler polymerized heterogeneous linear ethylene/$\alpha$-olefin interpolymers which have two or more melting peaks (determined using differential scanning calorimetry). Substantially linear olefin polymers are disclosed in U.S. Pat. Nos. 5,272,236 and 5,278,272 which are incorporated herein by reference.

The density of the SLOP as measured in accordance with ASTM D-792 is generally from 0.85 g/cc to 0.97 g/cc, preferably from 0.85 g/cc to 0.955 g/cc, and especially from 0.85 g/cc to 0.92 g/cc.

The melt index, according to ASTM D-1238, Condition 190° C./2.16 kg (also known as $I_2$), of the SLOP is generally from 0.01 g/10 min. to 1000 g/10 min., preferably from 0.01 g/10 min. to 100 g/10 min., and especially from 0.01 g/10min. to 10 g/10 min.

Also, included are the ultra low molecular weight ethylene polymers and ethylene/$\alpha$-olefin interpolymers described in patent application U.S. Ser. No. 08/784,683 filed Jan. 22, 1997 and entitled Ultra-low Molecular Weight Polymers (herein incorporated by reference), which was filed provisionally on Jan. 22, 1996 in the names of M. L. Finlayson, C. C. Garrison, R. E. Guerra, M. J. Guest, B. W. S. Kolthammner, D. R. Parikh, and S. M. Ueligger, as U.S. Ser. No. 60/010,403. These ethylene/$\alpha$-olefin interpolymers have $I_2$ melt indices greater than 1,000, or a number average molecular weight (Mn) less than 11,000.

The SLOP can be a homopolymer of $C_2$–$C_{20}$ olefins, such as ethylene, propylene, 4-methyl-1-pentene, etc., or it can be an interpolymer of ethylene with at least one $C_3$–$C_{20}$ $\alpha$-olefin and/or $C_2$–$C_{20}$ acetylenically unsaturated monomer and/or $C_4$–$C_{18}$ diolefin. SLOP can also be an interpolymer of ethylene with at least one of the above $C_3$–$C_{20}$ $\alpha$-olefins, diolefins (for example, those described in U.S. Ser. No. 08/679,538 filed Jul. 12, 1996 which is incorporated herein by reference) and/or acetylenically unsaturated monomers in combination with other unsaturated monomers.

Especially preferred olefin polymers suitable for use as the optional component comprise LDPE, HDPE, heterogeneous LLDPE, homogeneous linear ethylene polymers, SLOP, polypropylene (PP), especially isotactic polypropylene and rubber toughened polypropylenes, or ethylene-propylene interpolymers (EP), or chlorinated polyolefins (CPE), or ethylene-acrylic acid copolymers (EAA), or any combination thereof.

The term "block copolymer" is used herein to mean elastomers having at least one block segment of a hard polymer unit and at least one block segment of a rubber monomer unit. However, the term is not intended to include thermoelastic ethylene interpolymers which are, in general, random polymers. Preferred block copolymers contain hard segments of styrenic type polymers in combination with saturated or unsaturated rubber monomer segments. The structure of the block copolymers useful in the present invention is not critical and can be of the linear or radial type, either diblock or triblock, or any combination of thereof. Preferably, the predominant structure is that of triblocks and more preferably that of linear triblocks.

Suitable block copolymers having unsaturated rubber monomer units includes, but is not limited to, styrene-butadiene (SB), styrene-isoprene(SI), styrene-butadiene-styrene (SBS), styrene-isoprene-styrene (SIS), a-methylstyrene-butadiene-a-methylstyrene and a-methylstyrene-isoprene-a-methylstyrene.

The styrenic portion of the block copolymer is preferably a polymer or interpolymer of styrene and its analogs and homologs including $\alpha$-methylstyrene and ring-substituted styrenes, particularly ring-methylated styrenes. The preferred styrenics are styrene and a-methylstyrene, and styrene is particularly preferred.

Block copolymers useful in the present invention are commercially available, such as, for example, supplied by Shell Chemical Company under the designation of KRATON and supplied by Dexco Polymers under the designation of VECTOR.

Likewise, blends of the substantially random interpolymer with polyvinylchloride (PVC) or ethylene vinyl alcohol (EVOH) may be suitably employed.

Preparation of Foams

The foam structure of the present invention may take any physical configuration known in the art, such as sheet, plank, injection molded articles, or foam slab stock. Other useful forms are expandable or foamable particles, moldable foam particles, or beads, and articles formed by expansion and/or coalescing and welding of those particles.

Excellent teachings to processes for making ethylenic polymer foam structures and processing them are seen in C. P. Park, "Polyolefin Foam", Chapter 9, *Handbook of Polymer Foams and Technology,* edited by D. Klempner and K. C. Frisch, Hanser Publishers, Munich, Vienna, New York, Barcelona (1991), which is incorporated herein by reference. The present foam structure may be prepared by blending EVA with ESI and optional polymer component(s), blowing agent, peroxide, and other components (e.g. blowing agent activators such as ZnO, ZnSt, etc.; coagents such as triallyl cyanurate; fillers; antioxidants; pigments) are added to any suitable mixing device. These components are then mixed at a temperature below the decomposition temperature of the blowing agent and below the activation or "kick-off" temperature of the peroxide to ensure that all components are homogeneously dispersed within the blend. Once the components are relatively homogeneously dispersed within the polymer, the resulting mix is shaped and then exposed to conditions (e.g. heat, pressure, shear, etc.) over a sufficient period of time such that the peroxide is activated and the blowing agent is decomposed to make the foam.

In one embodiment of this invention, the foamable EVA/ESI blend comprising a decomposable chemical blowing agent and a cross-linking agent is prepared and extruded through a die, cross-linking is induced and the extruded melt polymer material is exposed to an elevated temperature to release the blowing agent to form the foam structure. The polymer material and the chemical blowing agent may be mixed and melt blended by any means known in the art such as with an extruder, mixer, or blender. The chemical blowing agent is preferably dry-blended with the polymer material prior to heating the polymer material to a melt form, but may also be added when the polymer material is in melt phase. Cross-linking may be induced by addition of a cross-linking agent or by radiation. Induction of cross-linking and exposure to an elevated temperature to effect foaming or expansion may occur simultaneously or sequentially. If a cross-linking agent is used, it is incorporated into the polymer material in the same manner as the chemical blowing agent. Further, if a cross-linking agent is used, the foamable melt polymer material is heated or exposed to a temperature of preferably less than 150° C. to prevent decomposition of the cross-linking agent or the blowing agent and to prevent premature cross-linking. If radiation cross-linking is used, the foamable melt polymer material is heated or exposed to a temperature of preferably less than 160° C. to prevent decomposition of the blowing agent. The foamable melt polymer material is extruded or conveyed through a die of desired shape to form a foamable structure. The foamable structure is then cross-linked and expanded at an elevated or high temperature (typically, 150° C.–250° C.) such as in an oven to form a foam structure. If radiation cross-linking is used, the foamable structure is irradiated to cross-link the polymer material, which is then expanded at the elevated temperature as described above. The present structure can advantageously be made in sheet or thin plank form according to the above process using either cross-linking agents or radiation.

The present foam structure may also be made into a continuous plank structure by an extrusion process utilizing a long-land die as described in GB 2,145,961A. In that process, the polymer, decomposable blowing agent and cross-linking agent are mixed in an extruder, heating the mixture to let the polymer cross-link and the blowing agent to decompose in a long-land die; and shaping and conducting away from the foam structure through the die with the foam structure and the die contact lubricated by a proper lubrication material.

The present foam structure may also be formed into cross-linked foam beads suitable for molding into articles. To make the foam beads, discrete resin particles such as granulated resin pellets are: suspended in a liquid medium in which they are substantially insoluble such as water; impregnated with a cross-linking agent and a blowing agent at an elevated pressure and temperature in an autoclave or other pressure vessel; and rapidly discharged into the atmosphere or a region of reduced pressure to expand to form the foam beads. A version is that the polymer beads is impregnated with blowing agent, cooled down, discharged from the vessel, and then expanded by heating or with steam. Blowing agent may be impregnated into the resin pellets while in suspension or, alternately, in non-hydrous state. The expandable beads are then expanded by heating with steam and molded by the conventional molding method for the expandable foam beads.

The foam beads may then be molded by any means known in the art, such as charging the foam beads to the mold, compressing the mold to compress the beads, and heating the beads such as with steam to effect coalescing and welding of the beads to form the article. Optionally, the beads may be pre-heated with air or other blowing agent prior to charging to the mold. Excellent teachings of the above processes and molding methods are seen in C. P. Park, above publication, pp. 227–233, U.S. Pat. Nos. 3,886,100, 3,959,189, 4,168,353, and 4,429,059. The foam beads can also be prepared by preparing a mixture of polymer, cross-linking agent, and decomposable mixtures in a suitable mixing device or extruder and form the mixture into pellets, and heat the pellets to cross-link and expand.

In another process for making cross-linked foam beads suitable for molding into articles, the substantially random interpolymer material is melted and mixed with a physical blowing agent in a conventional foam extrusion apparatus to form an essentially continuous foam strand. The foam strand is granulated or pelletized to form foam beads. The foam beads are then cross-linked by radiation. The cross-linked foam beads may then be coalesced and molded to form various articles as described above for the other foam bead process. Additional teachings to this process are seen in U.S. Pat. No. 3,616,365 and C. P. Park, above publication, pp. 224–228.

The present foam structure may be made in foam slab stock form by two different processes. One process involves the use of a cross-linking agent and the other uses radiation.

The present foam structure may be made in foam slab stock form by mixing EVA/ESI blend, a cross-linking agent, and a chemical blowing agent to form a slab, heating the mixture in a mold so the cross-linking agent can cross-link the polymer material and the blowing agent can decompose, and expanding by release of pressure in the mold. Optionally, the foam slab stock formed upon release of pressure may be re-heated to effect further expansion.

Cross-linked polymer sheet may be made by either irradiating polymer sheet with high energy beam or by heating a polymer sheet containing chemical cross-linking agent. The cross-linked polymer sheet is cut into the desired shapes and impregnated with nitrogen in a higher pressure at a temperature above the softening point of the polymer; releasing the pressure effects nucleation of bubbles and some expansion in the sheet. The sheet is reheated at a lower pressure above the softening point, and the pressure is then released to allow foam expansion.

Blowing agents and foaming agents as employed herein is interchangeable and have the same meaning.

Blowing agents useful in making the present foam structure include decomposable chemical blowing agents. Such chemical blowing agents decompose at elevated temperatures to form gases or vapors to blow the polymer into foam form. The agent preferably takes a solid form so it may be easily dry-blended with the polymer material. Chemical blowing agents include azodicarbonamide, azodiisobutyronitrile, benzenesulfonhydrazide, 4,4-oxybenzene sulfonyl-semicarbazide, p-toluene sulfonyl semi-carbazide, barium azodicarboxylate, N,N'-dimethyl-N,N'-dinitrosoterephthalamide, N,N'-dinitrosopentamethylenetetramine, 4-4-oxybis (benzenesulfonylhydrazide), trihydrazino triazine, sodium bicarbonate and citric acid. Azodicarbonamide is preferred. Additional teachings to chemical blowing agents are seen in C. P. Park, above publication, pp. 205–208, and F. A. Shutov, "Polyolefin Foam", *Handbook of Polymer Foams and Technology*, pp. 382–402, D. Klemper and K. C. Frisch, Hanser Publishers, Munich, Vienna, N.Y., Barcelona (1991).

The chemical blowing agent is blended with the polymer material in an amount sufficient to evolve 0.2 to 5.0, preferably from 0.5 to 3.0, and most preferably from 1.0 to 2.50 moles of gas or vapor per kilogram of polymer.

In some processes for making the present structure, a physical blowing agent may be used. Physical blowing agents include organic and inorganic agents. Suitable inorganic blowing agents include carbon dioxide, nitrogen, argon, water, air, nitrogen, and helium. Organic blowing agents include aliphatic hydrocarbons having 1–9 atoms, aliphatic alcohols having 1–3 carbon atoms, and fully and partially halogenated aliphatic hydrocarbons having 1–4 carbon atoms. Aliphatic hydrocarbons include methane, ethane, propane, n-butane, isobutane, n-pentane, isopentane, and neopentane. Aliphatic alcohols include methanol, ethanol, n-propanol, and isopropanol. Fully and partially halogenated aliphatic hydrocarbons include fluorocarbons, chlorocarbons, and chlorofluorocarbons. Examples of fluorocarbons include methyl fluoride, perfluoromethane, ethyl fluoride, 1,1-difluoroethane (HFC-152a), 1,1,1-trifluoroethane (HFC-143a), 1,1,1,2-tetrafluoro-ethane (HFC-134a), pentafluoroethane, difluoromethane, perfluoroethane, 2,2-difluoropropane, 1,1,1-trifluoropropane, perfluoropropane, dichloropropane, difluoropropane, perfluorobutane, perfluorocyclobutane. Partially halogenated chlorocarbons and chlorofluorocarbons for use in this invention include methyl chloride, methylene chloride, ethyl chloride, 1,1,1-trichloroethane, 1,1-dichloro-1-fluoroethane (HCFC-141b), 1-chloro-1,1-difluoroethane (HCFC-142b), chlorodifluoromethane (HCFC-22), 1,1-dichloro-2,2,2-trifluoroethane (HCFC-123) and 1-chloro-1,2,2,2-tetrafluoroethane (HCFC-124). Fully halogenated chlorofluorocarbons include trichloromonofluoromethane (CFC-11), dichlorodifluoromethane (CFC-12), trichlorotrifluoroethane (CFC-113), 1,1,1-trifluoroethane, pentafluoroethane, dichlorotetrafluoroethane (CFC-114), chloroheptafluoropropane, and dichlorohexafluoropropane.

The amount of blowing agent incorporated into the polymer melt material to make a foam-forming polymer gel is from 0.2 to 5.0, preferably from 0.5 to 3.0, and most preferably from 1.0 to 2.50 moles per kilogram of polymer.

Various additives may be incorporated in the present foam structure such as stability control agents, nucleating agents, inorganic fillers, pigments, antioxidants, acid scavengers, ultraviolet absorbers, flame retardants, processing aids, extrusion aids, and the like.

A stability control agent may be added to the present foam to enhance dimensional stability. Preferred agents include amides and esters of $C_{10-24}$ fatty acids. Such agents are seen in U.S. Pat. Nos. 3,644,230 and 4,214,054, which are incorporated herein by reference. Most preferred agents include stearyl stearamide, glycerol monostearate, glycerol monobehenate, and sorbitol monostearate. Typically, such stability control agents are employed in an amount ranging from 0.1 to 10 parts per hundred parts of the polymer.

In addition, a nucleating agent may be added in order to control the size of foam cells. Preferred nucleating agents include inorganic substances such as calcium carbonate, talc, clay, titanium oxide, silica, barium sulfate, diatomaceous earth, mixtures of citric acid and sodium bicarbonate, and the like. The amount of nucleating agent employed may range from 0.01 to 5 parts by weight per hundred parts by weight of a polymer resin.

The foam structure has a minimum expansion ratio of greater than about 1.25, preferably greater than about 1.3 and most preferably greater than about 1.35. Expansion ratio means the ratio of the foam dimension against the dimension of the same feature in the mold of tool, e.g. length, width, etc.

The foam structure may take any physical configuration known in the art, such as extruded sheet, rod, plank, and profiles. The foam structure may also be formed by molding of expandable beads into any of the foregoing configurations or any other configuration.

The foam structure may be closed-celled or open-celled according to ASTM D2856A.

Additives such as antioxidants (e.g., hindered phenols such as, for example, Irganox® 1010), phosphites (e.g., Irgafos® 168)), U. V. stabilizers, cling additives (e.g., polyisobutylene), antiblock additives, colorants, pigments, fillers, and the like can also be included in the interpolymers employed in the blends of and/or employed in the present invention, to the extent that they do not interfere with the enhanced properties discovered by Applicants.

The additives are employed in functionally equivalent amounts known to those skilled in the art. For example, the amount of antioxidant employed is that amount which prevents the polymer or polymer blend from undergoing oxidation at the temperatures and environment employed during storage and ultimate use of the polymers. Such amounts of antioxidants is usually in the range of from 0.01 to 10, preferably from 0.05 to 5, more preferably from 0.1 to 2 percent by weight based upon the weight of the polymer or polymer blend. Similarly, the amounts of any of the other enumerated additives are the functionally equivalent amounts such as the amount to render the polymer or polymer blend antiblocking, to produce the desired amount of filler loading to produce the desired result, to provide the desired color from the colorant or pigment. Such additives can suitably be employed in the range of from 0.05 to 50, preferably from 0.1 to 35, more preferably from 0.2 to 20 percent by weight based upon the weight of the polymer or polymer blend. However, in the instance of fillers, they could be employed in amounts up to 90 percent by weight based on the weight of the polymer or polymer blend.

EXAMPLES

The foams reported in the Table were produced and tested as described below.

I. Mixing

1. All ingredients are weighed into a plastic bag to the nearest 0.1 gram to prepare an 1100 gram batch.

2. The batch is charged to a type BR Banbury mixer. Rotor speed is manipulated to heat the mix into a temperature range of 95 to 110° C., where it is held for 3 minutes. The heating relies purely on friction and viscous dissipation. Typically, a rotor speed of 50 rpm maintains a temperature greater than the melting points of the polymers, but well below the decomposition temperatures of the peroxide or blowing agent.

3. The mix is dropped from the Banbury onto a roll mill heated to about 100° C. The mill is set to a narrow gap of 0.5 mm or less, and the entire batch is passed through the gap at least twice. This process ensures a fine dispersion of the particulate ingredients.

4. The mill gap is increased, the mix is banded on the mill, then sheeted off to yield a thickness of 1–2 mm. The thin sheet thickness helps ensure that all the air is forced out during the bun foam molding process, which would otherwise cause internal voids in the foam.

II. Molding

1. After cooling the sheet from the roll mill, the sheet is cut into squares, and placed inside a pre-heated mold of dimensions 4.5"×4.5"×0.5". The mold is teflon coated, and the vertical walls have a large draft angle of 30 degrees so the foam can expand without resistance. The top and bottom surfaces of the mold consist of squares of thin sheet metal with teflon sheets against the foam compound. The charge weight is determined by trial and error, to achieve a slight overfill of the mold. If the mold is underfilled, a portion of the foam will contain large cells that break through the skin. The large cells result from free foam expansion to fill the space in the mold. An overfill condition causes excessive flash, but does not produce any defects in the foam bun.

2. The loaded mold is immediately closed under 30 tons of pressure using a Carver press model 3467-0 with heated platens. The platen temperature is set at 168 C.

3. After 20 minutes cure time, the press is opened and the foam expands. Although the foam is essentially cool after a few hours, it continues to shrink and harden for about 24 hours. Therefore, the foams were aged one day before further processing.

Several measurements are taken on the foam slab as-molded, described below:

1. Expansion ratio: The length and width of the foam are measured across the center of the foam slab, as shown in FIG. 1. The expansion ratio is calculated as the average of these two measurements, divided by the width of the mold.

2. Hardness (Skin on): Foam hardness is typically measured on the Shore A or Asker C scales. In either case, the hardness reported here is an instantaneous reading, taken from the center of the bun.

III. Shaping

Before the foam can be thermoformed, it must be shaped to fit the mold, in this case a rectangular cavity 3"×6"×⅜".

Figure 2:
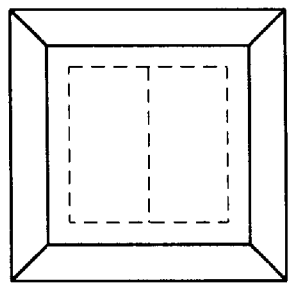
FIG. 2 is a schematic illustration of a shaped, foam slab positioned with a mold prior to thermoforming.

1. The edges of the bun are removed with a band saw, as shown in FIG. 2 leaving a square roughly 7"×7". The edges of the foam slab are sometimes distorted and ripped, and therefore are discarded.

2. The remaining foam square is cut in half, creating two pieces about 3.5"×7".

3. The skin on either side of the 3.5"×7" pieces is removed using a Hobart meat slicer, model 1812. The thickness is carefully shaved down to ⅝".

4. Next, the foam pieces are trimmed with the bandsaw to 3"×6". Careful work reduces the length and width error to less than 0.1".

5. The skin-off hardness is measured on the foam blanks, as described earlier.

6. Foam density before thermoforming is calculated by weighing each foam 3"×6"×⅝" blank, measuring the dimensions to the nearest 0.01", and computing density in g/cc.

IV. Thermoforming

1. The 3"×6"×⅝" foam blanks are fitted into a mold with two 3"×6"×⅜" cavities. The mold is initially at room temperature. The top and bottom surfaces of the mold are thin sheet metal lined with PET sheet.

2. The loaded mold is placed in a hand-pumped Pasadena Hydraulics press with the platens set to 150 C., and pressed under 30 tons pressure for 6 minutes. The compression ratio (⅝" compressed to ⅜") on the foams tested in this report is 40%, a common figure in the footwear industry.

3. After 6 minutes heating, the mold is removed and cooled using chilled platens under 30 tons pressure for 6 more minutes. The thermoformed foam samples can then be de-molded.

V. Foam Testing

After thermoforming, the foams are allowed to stabilize for one day before further testing. Often, the shrinkage measured after 24 hours is about twice that of the initial shrinkage measured immediately after thermoforming. Hardness also increases slightly in the first 24 hours after thermoforming. The various test methods are described below:

Shore A Durometer and Asker C Hardness

Instantaneous reading, average of five measurements on one ⅜" thickness of foam.

Density

The thermoformed foam slab is weighed to the nearest 0.1 g, and volume determined by measuring length, width, and thickness to the nearest 0.01".

Split Tear Strength

Figure 3:
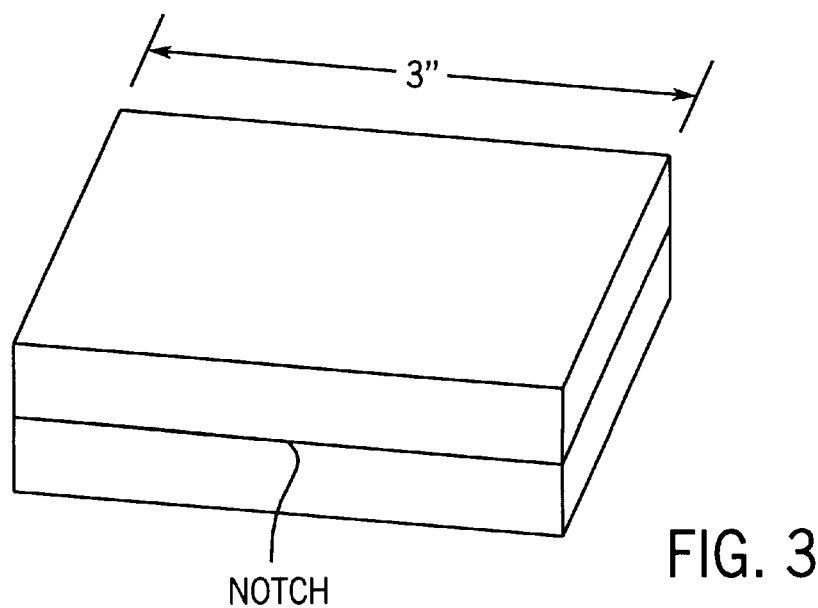
FIG. 3 is an illustration of a foam strip cut and notched for a split tear strength measurement.

An 1"×3" foam strip is cut, and notched with a razor to a depth of 0.5", as shown in FIG. 3. The two foam strips created by the razor notch are pulled apart in razor notch. An Instron at the rate of 2"/min until the tear progresses 0.5". The highest load recorded divided by the sample width is the split tear strength.

Oven Shrinkage

Foam samples marked and measured for length and width to the nearest 0.01 inch, placed in a pre-heated oven (typically 70 C.), and removed after the specified time (usually 1 to 4 hours). The samples are re-measured after at least 4 hours of cooling at room temperature. Percent shrinkage=100* (initial dimension—final dimension)/initial dimension Compression Set Measured per ASTM D395 method B, under conditions of 50% compression, and 50 C. for 6 hours. Two buttons tested per foam.

Falling Ball Rebound

A ⅝" diameter steel ball is dropped from a height of 20 inches onto the foam under test, and the rebound resilience is calculated is rebound height (in inches) * 100/20. The foam under test is a single layer at least ⅜" thick.

TABLE

| | Formulation | | | | |
|---|---|---|---|---|---|
| | 1 phr | 2 phr | 3 phr | 4 phr | 5 phr |
| ESI | 0 | 25 | 50 | 75 | 100 |
| Elvax 460 | 100 | 75 | 50 | 25 | 0 |
| DiCup 40KE | 1.25 | 1.625 | 1.75 | 1.875 | 2 |
| Celogen AZ130 | 3 | 3 | 3 | 3 | 3 |
| Magcarb L | 5 | 5 | 5 | 5 | 5 |
| Zinc Oxide | 1 | 1 | 1 | 1 | 1 |
| Zinc Stearate | 1 | 1 | 1 | 1 | 1 |
| Mold Temperature (C.) | 168 | 168 | 168 | 168 | 168 |
| Cure Time (minutes) | 20 | 20 | 20 | 20 | 20 |
| Expansion ratio | 1.93 | 1.8 | 1.89 | 1.81 | 1.86 |
| Density (skin off) | 0.097 | 0.105 | 0.104 | 0.103 | 0.105 |
| Thermoforming: 150 C. for 6 minutes, 20 C. for 10 minutes | | | | | |
| Asker C | 50 | 48 | 43 | 36 | 32 |
| Density | 0.166 | 0.188 | 0.178 | 0.174 | 0.166 |
| Shrink, 1 hr @ 70 C. | 1.55 | −0.3 | 0.55 | 3.2 | 7.5 |
| Resilience (%) | 49 | 52 | 56 | 63 | 67 |
| Split tear (kg/cm) | 2.6 | 2.6 | 2.5 | 1.9 | 1.4 |
| Compression set (%) | 50 | 38.1 | 38.2 | 52.8 | 61.8 | phr: parts per hundred resin
Materials
ESI: 31.4 weight % styrene, ethylene-styrene interpolymer, 1.0 melt index
Elvax 460: EVA with 18 weight % vinyl acetate, 2.5 melt index from DuPont de Nemours, Inc.
DiCup 40KE: dicumyl peroxide on Burgess clay (40% active), from Hercules Inc.
Celogen AZ130: Azodicarbonamide from Uniroyal Chemical Co.
Magcarb L: Magnesium carbonate powder from the Marine Magnesium Co.
Zinc Oxide: Kadox 911 from Zinc Corporation of America
Zinc Stearate: available from Synthetic Products Corp.

As illustrated in the preceeding Table, the crosslinked foams of this invention exhibit desirable properties not exhibited by crosslinked foams made from EVA or ESI alone. In the Table, Formulation 1 is a crosslinked foam prepared from EVA, Formulation 5 is a crosslinked foam prepared from ESI, and Formulations 2–4 are crosslinked foams prepared from blends of various amounts of EVA and ESI. Since the preparation of a crosslinked foam from ESI requires more dicumyl peroxide than does the preparation of a crosslinked foam from EVA, the amount of dicumyl peroxide used to prepare the crosslinked foams increased with the increasing percentage of ESI in the formulations. The remaining components of the foams were the same across the formulations as were the molding conditions. The resulting crosslinked foams exhibited comparable expansion ratios and density (skin off).

After thermoforming, the formulations of Table 1 were measured for various properties. Asker C is a measure of the hardness (or softness) of the foam with the larger the number, the harder the foam. An Asker C hardness of 50 is typical of a midsole application while an Asker C hardness of 30 is typical of a sock liner. Since thermoformed foams of ESI are softer than those of EVA, blending ESI with EVA produces a foam with an intermediate hardness (the measure of which is dependent upon, at least in part, the relative percentages of ESI and EVA). The density of the thermoformed crosslinked foams of the formulations were comparable with one another, but significant benefits were gained in shrink, resilience, split tear and compression set of a EVA/ESI blend foam over EVA foam or ESI foam.

With respect to shrink, the lower the number the less shrinkage and the less shrinkage, the more efficient the manufacturing process. Clearly, the preferred thermoformed crosslinked foams of Formulations 2 and 3 were markedly improved in shrink over either the EVA foam or the ESI foam. Moreover, this marked improvement in shrink was accomplished with increased resilience (the larger the number, the better) and comparable split tear (the higher the number, the better). Likewise, the compression set of preferred Formulations 2 and 3 was markedly improved over the compression set of either the EVA foam or the ESI foam.

Although the invention has been described in considerable detail through the preceeding specific embodiments, this detail is for purposes of illustration. Many variations modifications can be made by one skilled in the art without departing from the spirit and the invention.

What is claimed is:

1. A blend of ethylene vinyl acetate copolymer (EVA) and a substantially random interpolymer comprising, based on the weight of the blend, between about:

(A) 15 and about 85 weight percent EVA, and (B) 85 and about 15 weight percent of the substantially random interpolymer, wherein the substantially random interpolymer has a number average molecular weight (Mn) of at least 5,000.

wherein the substantially random interpolymer comprises:

(a) from about 1 to about 65 mole percent of polymer units derived from (i) at least one vinyl aromatic monomer, or (ii) at least one aliphatic or cycloaliphatic vinyl or vinylidene monomer, or (iii) a combination of at least one vinyl aromatic monomer and at least one aliphatic or cycloaliphatic vinyl or vinylidene monomer, and (b) from about 35 to about 99 mole percent polymer units derived from at least one $C_2$–$C_{20}$ α-olefin, and, optionally (c) polymer units derived from one or more ethylenically unsaturated polymerizable monomers other than those of (a) and (b).

2. The blend of claim 1 in which the EVA comprises between about 25 and about 75 weight percent EVA, and between about 75 and about 25 weight percent of the substantially random interpolymer.

3. The blend of claim 1 in which the EVA comprises between about 65 and about 50 weight percent EVA, and between about 35 and about 50 weight percent of the substantially random interpolymer.

4. The blend of claim 1 further comprising up to about 20 weight percent of at least one thermoplastic polymer other than EVA and the substantially random interpolymer.

5. The blend of claim 1 in which the substantially random interpolymer is an interpolymer wherein component (b) is ethylene and component (a)(i) is styrene.

6. The blend of claim 5 in which the substantially random interpolymer comprises between about 5 and about 15 mole percent of polymer units derived from styrene.

7. The blend of claim 1 further comprising at least one foaming agent and at least one cross-linking agent.

8. The blend of claim 7 in which at least one foaming agent is selected from the group consisting of azodicarbonamide, azodiisobutyro-nitrile, benzenesulfonhydrazide, 4,4-oxybenzene sulfonyl-semicarbazide, p-toluene sulfonyl semi-carbazide, barium azodicarboxylate, N,N'-dimethyl-N,N'-dinitrosoterephthalamide, N,N'-dinitrosopentamethylenetetramine, 4-4-oxybis(benzenesulfonylhydrazide), trihydrazino triazine, sodium bicarbonate and citric acid.

9. The blend of claim 8 in which the foaming agent is present in an amount sufficient to evolve between about 0.2 and about 5.0 moles of gas per kilogram of blend.

10. The blend of claim 7 in which at least one cross-linking agent is selected from the group consisting of peroxides, azides, silanes, phenols, aldehyde-amine reaction products, substituted ureas, substituted guanidines; substituted xanthates; substituted dithiocarbamates; sulfur-containing compounds, paraquinonedioxime, dibenzoparaquinonedioxime, sulfur; and combinations thereof.

11. The blend of claim 10 in which the cross-linking agent is a peroxide selected from the group consisting of dicumyl peroxide, t-butylisopropylidene peroxybenzene, 1,1-di-t-butyl peroxy-3,3,5-trimethylcyclohexane, 2,5-dimethyl-2,5-di(t-butyl peroxy) hexane, t-butyl-cumyl peroxide, di-t-butyl peroxide, and 2,5-dimethyl-2,5-di-(t-butyl peroxy) hexyne.

12. The blend of claim 10 in which the cross-linking agent is a azide selected from the group consisting of azidoformates, aromatic polyazides, and sulfonazides.

13. The blend of claim 10 in which the cross-linking agent is an unsaturated silane that comprises an ethylenically unsaturated hydrocarbyl group and a hydrolyzable group.

14. The blend of claim 10 in which the cross-linking agent is present in an amount between about 0.5 and 12 weight percent.

15. The blend of claim 10 further comprising a cross-linking catalyst.

16. The blend of claim 15 in which the cross-linking catalyst is selected from the group consisting of organic bases, carboxylic acids, and organometallic compounds.

17. The blend of claim 16 in which the cross-linking catalyst is an organometallic compound selected from the group consisting of (i) organic titanates, and (ii) complexes or carboxylates of lead, cobalt, iron, nickel, zinc and tin.

18. An at least partially cross-linked EVA/substantially random interpolymer foam, wherein the substantially random interpolymer comprises:

(a) from about 1 to about 65 mole percent of polymer units derived from (i) at least one vinyl aromatic monomer, or (ii) at least one aliphatic or cycloaliphatic vinyl or vinylidene monomer, or (iii) a combination of at least one vinyl aromatic monomer and at least one aliphatic or cycloaliphatic vinyl or vinylidene monomer, and (b) from about 35 to about 99 mole percent polymer units derived from at least one $C_2$–$C_{20}$ α-olefin, and, optionally (c) polymer units derived from one or more ethylenically unsaturated polymerizable monomers other than those of (a) and (b).

19. The foam of claim 18 in which, based on the weight of the foam, the EVA comprises between about 85 and about 15 weight percent, and the substantially random interpolymer comprises between about 15 and about 85 weight percent.

20. The foam of claim 18 in which the EVA comprises between about 25 and about 75 weight percent EVA, and between about 75 and about 25 weight percent of the substantially random interpolymer.

21. The foam of claim 18 in which the EVA comprises between about 65 and about 50 weight percent EVA, and between about 35 and about 50 weight percent of the substantially random interpolymer.

22. The foam of claim 18 further comprising up to about 20 weight percent of at least one thermoplastic polymer other than EVA and the substantially random interpolymer.

23. The foam of claim 18 in which the substantially random interpolymer is an interpolymer of ethylene and styrene.

24. The foam of claim 23 in which the substantially random interpolymer comprises between about 5 and about 15 mole percent of polymer units derived from styrene.

25. A fabricated part comprising a foam of any of claims 18–24.

26. The fabricated part of claim 25 in the shape of a gasket or footwear article.

27. The fabricated part of claim 25 in the shape of a shoe midsole, shoe outer sole, sock liner, refrigerator gasket or an automotive gasket.

28. The blend of claim 1, wherein the substantially random interpolymer has an $M_n$ between 20,000 and 1,000,000.

29. The blend of claim 1, wherein the substantially random interpolymer has an $M_n$ between 50,000 and 500,000.

30. A blend of EVA and a substantially random interpolymer comprising, based on the weight of the blend, between about:

(A) 15 and about 85 weight percent EVA, and (B) 85 and about 15 weight percent of the substantially random interpolymer, wherein the substantially random interpolymer comprises (a) from about 1 to about 65 mole percent of polymer units derived from (i) at least one vinyl aromatic monomer, or (ii) at least one aliphatic or cycloaliphatic vinyl or vinylidene monomer, or (iii) a combination of at least one vinyl aromatic monomer and at least one aliphatic or cycloaliphatic vinyl or vinylidene monomer, and (b) from about 35 to about 99 mole percent polymer units derived from at least one $C_2$–$C_{30}$ α-olefin, and, optionally (c) polymer units derived from one or more ethylenically unsaturated polymerizable monomers other than those of (a) and (b), and wherein the α-olefin is selected from the group consisting of ethylene or a combination of ethylene and $C_{3-8}$ α-olefins.

* * * * *